UNITED STATES PATENT OFFICE.

LITTLE J. GREEN AND HENRY HEYN, OF MARSHALL, TEXAS.

PROCESS OF MAKING SOFT PEANUT CANDY.

No. 864,298.      Specification of Letters Patent.      Patented Aug. 27, 1907.

Application filed July 6, 1906. Serial No. 325,043.

*To all whom it may concern:*

Be it known that we, LITTLE JIMMIE GREEN and HENRY HEYN, citizens of the United States, residing at Marshall, in the county of Harrison and State of Texas, have invented new and useful Improvements in Processes of Making Peanut Candy, of which the following is a specification.

This invention relates to the process of making peanut candy by using water, and has for its object, to make a peanut candy that is soft and firm, that can be used, handled, shipped, stored and sold at all seasons of the year and in all climates and temperatures without becoming spoiled, decayed, sticky or melting.

In making peanut candy heretofore by using sugar, peanuts and glucose the article could only be used handled shipped or stored in certain temperatures and climates, because of the injurious effects of warm or cold temperatures upon it.

Our process of making soft peanut candy consists in the use of the following ingredients, combined in the proportions stated and in the manner described: Twenty pounds of white granulated sugar. Twenty pounds of yellow clarified sugar. Enough pure water to dissolve the above amounts of sugar. Ten pounds of glucose. Twenty five pounds of peanuts.

The above ingredients are cooked to between two hundred and seventy five and two hundred and ninety five degrees Fahrenheit scale, being thoroughly mixed by agitation while cooking and when the above temperature has been reached in the cooking of the ingredients pour into and thoroughly mix with the ingredients, by agitation four pounds of water, and the ingredients are taken from the cooking vessels and allowed to cool and the process is completed. This has the effect of suddenly reducing the temperature of the ingredients of which the candy is composed and causes the candy to be of a soft firm nature which it retains in any and all temperatures.

We claim:

The herein described process of making peanut candy by using twenty pounds of white granulated sugar, twenty pounds of yellow clarified sugar, enough pure water to dissolve the above amount of sugar, ten pounds of glucose, twenty five pounds of peanuts, cooked to between two hundred and seventy five and two hundred and ninety five degrees Fahrenheit scale; and when this degree has been reached in the cooking of the ingredients, pouring into and mixing with them by agitation four pounds of water, substantially as described.

L. J. GREEN.
HENRY HEYN.

Witnesses:
W. W. MORLEY,
O. H. RESBRAGEL.